United States Patent [19]

Middlebrook

[11] 4,424,259

[45] Jan. 3, 1984

[54] ARTICLES FROM ALKADIENE-VINYL ARENE COPOLYMERS HEAT-BONDED TO VINYL CHLORIDE POLYMERS

[75] Inventor: Terence C. Middlebrook, Bartlesville, Okla.

[73] Assignee: Phillips Petroleum Company, Bartlesville, Okla.

[21] Appl. No.: 334,020

[22] Filed: Dec. 23, 1981

[51] Int. Cl.$^3$ ............... B32B 13/12; B32B 9/04
[52] U.S. Cl. .................................. 428/451; 428/497; 428/518; 428/519; 428/521; 428/522; 428/331; 36/30 R; 36/32 R; 36/87; 156/242; 12/142 RS; 2/87; 526/340
[58] Field of Search ............... 428/518, 519, 331, 497, 428/451, 521, 522

[56] References Cited

U.S. PATENT DOCUMENTS

| | | |
|---|---|---|
| 3,239,478 | 3/1966 Harlan, Jr. ............ | 428/519 X |
| 3,919,035 | 11/1975 Warrach ............. | 428/519 X |
| 4,314,926 | 2/1982 Allison ............... | 260/33.6 AQ |

Primary Examiner—P. Ives

[57] ABSTRACT

Shaped articles are formed from a composition comprising a mixture of (1) a thermoplastic elastomer copolymer of at least one conjugated diene and at least one vinyl arene, preferably a butadiene-styrene block copolymer and (2) at least one poly(vinyl arene) resin, preferably poly(alphamethyl styrene), which is thermally bonded sans adhesive to smooth plastics consisting essentially of polymers or copolymers of vinyl chloride.

14 Claims, No Drawings

ARTICLES FROM ALKADIENE-VINYL ARENE COPOLYMERS HEAT-BONDED TO VINYL CHLORIDE POLYMERS

BACKGROUND

This invention pertains to thermoplastic elastomers and their adhesion to smooth finish plastics, more particularly, the thermal bonding without adhesive of a butadiene-styrene copolymer to polyvinylchloride (PVC).

The development of teleblock copolymers of butadiene and styrene has produced unique combinations of high strength, elasticity, and thermoplasticity, as described in "Compounding Radial Block Polymers," J. R. Haws and T. C. Middlebrook, *Rubber World*, January, 1973, pp 27–32 and 48. By varying the proportions of the comonomers and various additives, it is possible to design compositions which optimize desirable characteristics for particular applications. Because of desirable appearance, feel, traction and ease of processing, such thermoplastic elastomers have found widespread use as base materials for many types of shoe soling. These compositions are suitable for injection molding of soles directly onto shoe uppers of porous materials such as canvas or leather, finding many applications in casual, tennis and deck shoes. Such compositions have not heretofore been prepared for bonding directly to PVC, however.

SUMMARY OF THE INVENTION

It is an object of this invention to provide a process for bonding thermoplastic elastomers comprising diene-vinyl arene copolymers to smooth, essentially nonporous plastics consisting essentially of vinyl chloride polymer for applications in shaped articles such as combinations of shoe soling and uppers. A further object of this invention is to provide a thermoplastic elastomer composition which can be bonded directly to smooth plastics consisting essentially of vinyl chloride polymer, without the use of an adhesive, by such processes as injection molding. Another object of this invention is to provide molding articles, laminates or conjunctions of sections of thermoplastic elastomers and plastics consisting essentially of vinyl chloride polymer which are useful for various purposes.

In accordance with this invention it is discovered that a composition comprising a mixture of (1) a thermoplastic elastomer copolymer of at least one conjugated diene and at least one vinyl arene, preferably a butadiene-styrene block copolymer; (2) at least one poly(vinyl arene) resin, preferably poly(alpha-methylstyrene); (3) optionally an extender oil, and (4) optionally a filler; can be bonded directly to smooth, essentially nonporous plastics consisting essentially of vinyl chloride polymer, without the use of adhesives, using thermal processes such as injection molding. Thus a process of joining these materials, and useful shaped articles made thereby, are provided by this invention.

DESCRIPTION OF THE PREFERRED EMBODIMENT

This invention pertains to a new process for thermally bonding compositions comprising elastomeric, thermoplastic alkadiene-vinyl arene copolymers directly to smooth, essentially nonporous plastics, consisting essentially of vinyl chloride polymer without the use of an adhesive. Said copolymers can be substantially linear or substantially radially branched, being preferably substantially radially branched block copolymers such as those described in U.S. Pat. No. 3,281,383, herein incorporated by reference.

The thermoplastic elastomers useful in this invention can be defined by the formula $$(AB)_xY$$

wherein A is a non-elastomeric vinyl arene polymer or copolymer block, B is an elastomeric conjugated alkadiene polymer or copolymer block, x is an integer ranging from 2 to about 10, and Y is a molecular unit or atom from a coupling agent or multifunctional initiator, or alternatively, simply a chemical bond, in which case x must be 2. Preferably, Y is Si from a $SiCl_4$ coupling agent. The vinyl arenes of A can be those with 8 to about 18 carbon atoms, especially styrene and α-methyl styrene. The conjugated alkadienes of B can have from 4 to about 12 carbon atoms, e.g., butadiene, isoprene, piperylene, etc.

The more preferred thermoplastic alkadiene-vinyl arene copolymer elastomers employed in this invention are butadiene-styrene radial teleblock copolymers such as those described in U.S. Pat. No. 3,639,521, herein incorporated by reference, having a bound styrene content ranging from about 10 percent by weight to about 60 percent by weight, most preferably from about 20 percent by weight to about 50 percent by weight, and a number average molecular weight $M_n$ ranging from about 20,000 to about 500,000, preferably from about 100,000 to about 300,000, and most preferably from about 180,000 to about 220,000.

The compositions containing at least one alkadiene-vinyl arene copolymer further comprise, for improving the adhesion to the vinyl chloride polymer, at least one poly(vinyl arene) resin, preferably one having the structure

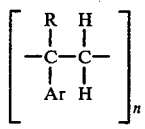

wherein R is an alkyl radical having from 1 to 4 carbon atoms, Ar is an aromatic radical which may be unsubstituted or hydrocarbyl substituted (particularly alkyl substituted); Ar has preferably 6 to 18 carbon atoms; Ar can be a phenyl group, or a benzyl group, or ortho-, meta-, or para-tolyl groups, or ortho-, meta-, or para-xylyl groups, or naphthyl groups and the like, and n is a whole number ranging from about 5 to about 50. The most preferred poly(vinyl arene) resin is poly(alphamethylstyrene) having a number average molecular weight $M_n$ ranging from about 500 to 5000, preferably 800 to about 1,200. The poly(vinyl arene) resin can be employed in amounts ranging from about 5 phr (parts by weight per 100 parts by weight of rubber, i.e. thermoplastic elastomer) to about 40 phr, more preferably ranging from about 10 phr to about 30 phr. Preferably, a polystyrene resin can be mixed with said poly(vinyl arene) resin in amounts ranging from 0 to about 15 phr.

The compositions comprising at least one alkadiene-vinyl arene copolymer and at least one poly(vinyl arene) resin can optionally contain a paraffinic, naphthenic or aromatic hydrocarbon extender oil for control of hardness, most preferably a naphthenic oil, and additionally a filler, for improving the adhesion to the vinyl chloride polymer after heat-aging, most preferably an amorphous, precipitated silica. Preferred amounts of the extender oil range from about 25 phr to about 45 phr, whereas preferred amounts of filler such as silica range from about 10 phr to about 25 phr. Most preferred are silica fillers having a silica content of at least 85 weight percent and a BET surface area ranging from 100 to 200 square meters per gram. It is understood that said compositions can also contain minor amounts of antioxidants, antiozonants, lubricants, pigments, and the like.

The vinyl chloride polymer plastics to which the elastomeric, thermoplastic compositions comprising at least one alkadiene-vinyl arene copolymer and at least one poly(vinyl arene) resin are thermally bonded, can be polyvinyl chloride (PVC) or copolymers prepared from vinyl chloride as the predominant monomer and a comonomer such as vinyl acetate, ethylene, propylene, vinylidene chloride, methyl acrylate, ethyl acrylate, acrylonitrile, n-butylvinyl ether, isobutylvinyl ether and the like. The plastic vinyl chloride polymer used in my invention can also contain small, but effective amounts of pigments, plasticizers, fillers, stabilizers and polymeric impact improvers such as acrylonitrilebutadiene-styrene copolymer, polyethylene, ethylene-vinyl acetate copolymer and the like. The most preferred vinyl chloride polymer for my invention is polyvinyl chloride (PVC). Blowing agents can be used in these polymers to produce porosity, which is often a desirable feature in materials used for shoe uppers. See, e.g., U.S. Pat. No. 4,168,341.

The elastomeric, thermoplastic compositions can be bonded to plastics essentially consisting of vinyl chloride polymer by any of the well known thermal bonding methods such as injection molding, compression molding, high frequency flow molding employing radio frequency or microwave radiation, hot air heat sealing and the like. The more preferred bonding method is by injection molding, at a pressure ranging from about 10 psi to about 200 psi, at a temperature of about 300°–450° F.

Among the useful shaped articles that can be produced using the compositions and processes of this invention are shoes, luggage, rainwear, hoses and other bonded combinations of sections of elastomers and plastics.

The preparation of the thermoplastic elastomer compositions of this invention and their bonding to samples of representative vinyl chloride polymer material are described in the following examples, which are illustrative of the means of practicing this useful invention.

EXAMPLE I

This example describes the compounding of thermoplastic butadiene-styrene radial teleblock copolymers with poly(alpha-methylstyrene), plus optionally an extender oil, fillers, processing aids, antioxidants, and pigments. Mixing was carried out in a "BR" Banbury mixer at a speed of 118 rpm for about 4–8 minutes. Oil was added in four equal increments at one-minute intervals. Mixed rubber (elastomer) compositions were dumped at a temperature range of 135° F. to 155° F. onto a 6"×12" roll mill (mill gauge: 3.75 mm) for sheeting.

Compositions of prepared rubber blends are listed in Tables IA and IB.

TABLE IA

| Ingredients | Run 1 Control | Run 2 Invention | Run 3 Invention | Run 4 Invention | Run 5[1] Invention |
|---|---|---|---|---|---|
| Butadiene-styrene Copolymer[2], parts by wt. | 100 | 100 | 100 | 100 | 100 |
| Oil[3], parts by wt. | 25 | 25 | 31.3 | 34.4 | 35–41 |
| Poly(alpha-methylstyrene)[4], parts by wt. | 0 | 18.8 | 18.8 | 18.8 | 10–25 |
| Silica Filler[5], parts by wt. | 0 | 0 | 12.5 | 12.5 | 17–21 |
| Polystyrene[6], parts by wt. | 0 | 0 | 0 | 12.5 | 10–13 |
| Zinc Stearate, parts by wt. | 0.2 | 0.2 | 0.2 | 0.2 | 0.3 |
| Stabilizers[7], parts by wt. | 0 | 0 | 0 | 0 | 0.8 |
| Pigments, parts by wt. | 0 | 0 | 0 | 0 | 0.1 |

[1]A rubber compound the composition of which varies within the indicated ranges, marketed under the designation of Solprene ® 602A by Phillips Petroleum Company.
[2]Solprene ® 481, a butadiene-styrene radial teleblock copolymer containing 40 weight percent bound styrene, coupled with SiCl$_4$, having a molecular weight M$_n$ of about 200,000, marketed by Phillips Petroleum Company.
[3]Flexon ® 766, a naphthenic extender oil having a specific gravity of 0.8899, a color (ASTM) of 1.0, a viscosity at 210° F. of 56.4 SUS, marketed by Exxon Company.
[4]AMOCO ® 18-290 having a molecular weight of about 960, a softening point of about 286° F., and a specific gravity of about 1.075, marketed by Amoco Corporation.
[5]Hi Sil ® 233, an amorphous, hydrated, precipitated silica containing 87 weight percent SiO$_2$ hydrate, having a surface area (BET) of 140–160 m$^2$/g, marketed by PPG Industries.
[6]Cosden ® 500 Sp marketed by Cosden Oil Company.
[7]Containing approximately equal amounts of Irganox ® 1035 marketed by Ciba-Geigy, dilauryl thiodipropionate (DLTDP), and Tinuvin ® marketed as a UV stabilizer by Ciba-Geigy.

TABLE IB

| Ingredients | Run 6 Invention | Run 7 Invention | Run 8 Invention | Run 9 Invention |
|---|---|---|---|---|
| Butadiene-Styrene Copolymer I[1], parts by wt. | 100 | 100 | — | — |
| Butadiene-Styrene Copolymer II[2], parts by wt. | — | — | 100 | 100 |
| Oil[3], parts by wt. | 26.7 | 26.7 | 26.7 | 26.7 |
| Poly(alpha-methylstyrene)[3], parts by wt. | 20 | 20 | 26.7 | 26.7 |
| Silica Filler[3], parts by wt. | 0 | 13.3 | 0 | 13.3 |
| Zinc Stearate, parts by wt. | 0.2 | 0.2 | 0.2 | 0.2 |

[1]Solprene ® 475, a butadiene-styrene radial teleblock copolymer with about 40 weight percent of bound styrene, coupled with SiCl$_4$, having a molecular weight M$_n$ of about 180,000 marketed by Phillips Petroleum Company.
[2]Solprene ® 480, a butadiene-styrene radial teleblock copolymer with about 30 weight percent bound styrene, coupled with SiCl$_4$, having a molecular weight of about 220,000.
[3]See footnotes, Table IA.

EXAMPLE II

In this example the preparation of my inventive elastomer-PVC laminates is described.

Elastomer (rubber) blends prepared according to the recipes and procedure described in Example I were injection molded onto 1"×5" strips of Black Tierra Patina VN-3 polyvinylchloride (PVC), marketed by Phillips-Chemtex International, Inc. An area of 1"×0.5" of each PVC strip was covered so as to prevent lamination with rubber.

Molding was carried out on a New Britain 75 molding machine at an injection pressure of 25–50 psi during an initial period of six seconds, and subsequently at 25–50 psi during a period of 30 seconds. The temperatures in the four molding zones were 392° F. in zone 1; 392° F. in zone 2; 374° F. in zone 3; and 356° F. in zone 4.

Data regarding the adhesive strength between the rubber and the PVC sheets of my inventive laminates are listed in Table II. Adhesion was determined by a 180° peel test on a tensile tester at a separation rate of 2 inches per minute. Aging was carried out in air at the specified temperatures.

TABLE II

| | | Adhesion Between Rubber and PVC, KN/m | | |
|---|---|---|---|---|
| | | After Aging for 1 Week | | After Aging for 4 Weeks | |
| Run | Initial | at 25° C. | at 70° C. | at 25° C. | at 70° C. |
| 1 (Control) | 1.9 | 1.5 | 2.9 | 1.4 | 0.4 |
| 2 (Invention) | 6.2 | 5.6 | 7.2 | 5.6 | 0.1 |
| 3 (Invention) | 6.2 | 5.9 | 8.8 | 6.5 | 4.2 |
| 4 (Invention) | 5.6 | 5.3 | 11.0 | 5.5 | 7.4 |
| 5 (Invention) | 5.4 | 4.4 | 10.0 | 3.8 | 9.4 |
| 6 (Invention) | 5.7 | 5.2 | 5.3 | 5.5 | 0.2 |
| 7 (Invention) | 5.3 | 5.3 | 8.3 | 5.4 | 10.0 |
| 8 (Invention) | 3.1 | 3.7 | 4.4 | 3.2 | 3.0 |
| 9 (Invention) | 3.8 | 3.3 | 5.4 | 3.2 | 7.1 |

Data in Table II show that the rubber-PVC laminates of runs 2–9 are the preferred ones of my invention. The rubber layer of these laminates comprised a butadiene styrene radial teleblock copolymer, an extender oil, and poly(alpha-methylstyrene). Initial rubber-PVC adhesion as well as adhesion after aging at 25° C. were considerably higher than for laminates without poly(alpha-methylstyrene) in the rubber phase (control run 1).

In addition, data in Table II show that laminates also containing silica (Hi-Sil 233) in the rubber phase (runs 3, 5, 6, 7 and 9) exhibit a stronger bonding between the rubber and PVC phases after aging at 70° C. (in air) for four weeks than laminates without silica.

The most preferred laminates, having the highest adhesion after four weeks of heat aging at 70° C. in air, were those comprising a butadiene-styrene radical teleblock copolymer, a naphthenic extender oil, silica, poly(alpha-methylstyrene), and finally, a polystyrene resin (runs 4 and 5).

While this invention has been described in detail for the purpose of illustration, it is not to be construed as limited thereby, but is intended to cover all the changes and modifications within the spirit and scope thereof.

I claim:
1. Shaped articles comprising
   (a) a first section consisting essentially of a polymer or copolymer of vinyl chloride, and thermally bonded to said first section substantially without an adhesive,
   (b) at least one second section formed of a composition comprising:
      (1) a thermoplastic elastomeric copolymer of an alkadiene and a vinyl arene; and
      (2) a poly(vinyl arene) resin having the structure

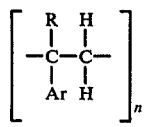

wherein R is an alkyl radical having from 1 to 4 carbon atoms, Ar is an aromatic radical which can be unsubstituted or hydrocarbyl substituted, having from 6 to about 18 carbons, and n is a whole number ranging from about 5 to 50.

2. Shaped articles in accordance with claim 1, wherein said first section consists essentially of polyvinyl chloride.

3. Shaped articles in accordance with claim 1, wherein said second section comprises an extender oil.

4. Shaped articles in accordance with claim 1, wherein said thermoplastic elastomeric copolymer of said second section is described by the formula $(AB)_xY$, wherein A is a non-elastomeric vinyl arene polymer or copolymer block, B is an elastomeric conjugated alkadiene polymer or copolymer block, x is an integer ranging from 2 to about 10, and Y is a molecular unit or atom from a coupling agent or multifunctional initiator, or alternatively, simply a chemical bond, in which case x must be 2; and is a butadiene-styrene block copolymer having a bond styrene weight percentage of about 20–50 weight percent and a molecular weight, $M_n$ of about 100,000 to 300,000, being a linear or radial copolymer.

5. Shaped articles in accordance with claim 4, wherein said butadiene-styrene copolymer $(AB)_xY$ is a radial block copolymer and has a bound styrene weight percentage of 30 to 50 percent and a molecular weight, $M_n$ of about 180,000–220,000, and Y is Si.

6. Shaped articles in accordance with claim 1, wherein said poly(vinyl arene) resin of said second section is a poly(alpha-methyl styrene) having a molecular weight $M_n$ in the range of about 500 to 5,000.

7. Shaped articles in accordance with claim 6, wherein said poly(alpha-methyl styrene) has a molecular weight $M_n$ in the range of about 800 to 1200.

8. Shaped articles in accordance with claim 6, wherein said second section additionally comprises a polystyrene resin in amounts ranging from 0 to about 15 parts by weight per 100 parts by weight of said thermoplastic elastomer.

9. Shaped articles in accordance with claim 3, wherein said extender oil of said second section is a naphthenic oil.

10. Shaped articles in accordance with claim 1, wherein said second section comprises a silica filler.

11. Shaped articles in accordance with claim 10, wherein said silica filler has a silica content of at least 85 weight percent and a BET surface area of about 100 to 200 square meters per gram.

12. Shaped articles in accordance with claim 1, wherein said second section comprises about 100 parts by weight of said thermoplastic elastomeric copolymer, about 5 to about 40 parts by weight of said poly(vinyl arene) resin, about 0 to about 45 parts by weight of said extender oil, 0 to about 25 parts by weight of a silica filler, and 0 to about 15 parts by weight of a polystyrene resin.

13. Shaped articles comprising
   (a) a first section consisting essentially of a polymer or copolymer of vinyl chloride, and thermally bonded to said first section substantially without an adhesive,
   (b) at least one second section consisting essentially of a composition comprising:
      (1) a thermoplastic elastomeric copolymer of an alkadiene and a vinyl arene; and
      (2) a poly(vinyl arene) resin having the structure

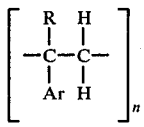

wherein R is an alkyl radical having from 1 to 4 carbon atoms, Ar is an aromatic radical which can be unsubstituted or hydrocarbyl substituted, having from 6 to about 18 carbons, and n is a whole number ranging from about 5 to 50.

14. Shaped articles comprising
(a) a first section consisting essentially of a polymer or copolymer of vinyl chloride, and thermally bonded to said first section substantially without an adhesive, (b) a least one second section consisting essentially of a composition comprising:
(1) a thermoplastic elastomeric copolymer of an alkadiene and a vinyl arene;
(2) a poly(vinyl arene) resin having the structure

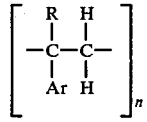

wherein R is an alkyl radical having from 1 to 4 carbon atoms, Ar is an aromatic radical which can be unsubstituted or hydrocarbyl substituted, having from 6 to about 18 carbons, and n is a whole number ranging from about 5 to 50; and
(3) a polystyrene resin.

* * * * *